United States Patent [19]

Caracuzzo

[11] Patent Number: 6,059,841
[45] Date of Patent: May 9, 2000

[54] UPDATING DATA DEPENDENCIES FOR LOOP STRIP MINING

[75] Inventor: Terry J. Caracuzzo, Dallas, Tex.

[73] Assignee: Hewlett Packard Company, Palo Alto, Calif.

[21] Appl. No.: 08/879,210

[22] Filed: Jun. 19, 1997

[51] Int. Cl.[7] .................................................... G06F 9/45
[52] U.S. Cl. ............................................................ 717/9
[58] Field of Search ................................ 395/709; 717/9

[56] References Cited

U.S. PATENT DOCUMENTS

| | | | |
|---|---|---|---|
| 5,274,818 | 12/1993 | Vasilevsky et al. | 395/709 |
| 5,491,823 | 2/1996 | Ruttenberg | 395/708 |
| 5,797,013 | 8/1998 | Mahadevan et al. | 395/709 |
| 5,802,375 | 9/1998 | Ngo et al. | 395/709 |
| 5,812,852 | 9/1998 | Poulsen et al. | 395/706 |
| 5,822,593 | 10/1998 | Lamping et al. | 395/709 |

*Primary Examiner*—Paul R. Lintz
*Assistant Examiner*—John Q. Chavis

[57] ABSTRACT

The inventive system and method uses two relationships to update the distance vector after the loop strip-mining optimization has been performed by the compiler. The invention applies the original distance vector for the un-stripmined loop and the strip size from the strip-mining optimization to the relationships, and outputs either one or two distance vectors, depending upon whether the distance is a multiple of the strip size. The invention allows subsequent optimization to occur after strip-mining, and eliminates the need of having to normalize the stripmined loop to recompute the subscripts. The invention also eliminates the need to re-analyze the dependencies of the loop.

43 Claims, 2 Drawing Sheets

UPDATING DATA DEPENDENCIES FOR LOOP STRIP MINING

TECHNICAL FIELD OF THE INVENTION

This application relates in general to system compiler optimization, and in specific to updating distance vectors after the compiler performs a loop strip-mining optimization on program code.

BACKGROUND OF THE INVENTION

Dependency analysis is a set of legality rules, which is a constraint on the order of memory references, that is determined by a compiler. For example, memory reference B is considered to be dependent on memory reference A, if B follows A in a serial execution of a program, or if both A and B reference the same memory location. There are memory reference dependencies which constrain memory references to occur in the order required by the semantics of the program language. Memory reference dependencies include an output dependence which constrains the order in which two assigns occur, an anti-dependence which constrains the use to precede an assign, a flow dependence which constrains an assign to precede the use, and an input dependence which constrains the order in which two uses occur. Other dependencies include control dependence which constrains an operation to follow a test that determines whether the flow of control will make it possible for the operation to be executed, and an operation dependence which constrains an operation to follow its inputs.

FIG. 1 illustrates the general structure of a typical compilation environment 10 wherein there is source file 11 that comprises a program written by some user in some high level language. File 11 is processed by compiler 12 into object file 13, which typically consists of a sequence of machine instructions that are the result of translating the high level source statements in source file 11. Object file 13 is then processed by linker program 14, which combines object file 13 with other object files 15, which resulted from other source files (not shown), to produce executable program 16. Executable program 16 is then eligible for direct execution on computer 17. Thus, the program reads some input 18 and performs some processing, and generates some output 19. The dependency analysis and loop optimizations are typically implemented as part of the compiler shown in FIG. 1.

FIG. 2 depicts a view of the internal structure of optimizing version of compiler 12 of FIG. 1. This type of compiler not only translates source files 11 into object file 13, but also attempts to improve the run time performance of the created object file. The compiler begins with source file 11. The source file is read in and checked for syntax errors or semantic errors by front end 21 of the compiler front end 21. Assuming that there are no errors, the compilation proceeds with front end 21 generating intermediate representation 22. Optimizer 23 attempts to improve the structure of intermediate representation 22 and thereby increase run-time performance, by performing transformations that would allow the code to be executed faster. The final step involves generating object file 13, which is typically done at the very back end of the compiler by object file generator 24.

FIG. 3 depicts the internal structure of optimizer 23 that is shown in FIG. 2. The optimizer begins with the unoptimized low level intermediate representation 31 for each procedure being compiled and generates the optimized intermediate representation 35 for each procedure. The first phase is analysis 32 of the intermediate representation to determine which optimizations can be performed. This includes recognizing the loop structure in the procedure that is being compiled, and performing dependency analysis. The second phase is to perform various optimizations on the code, including loop optimizations, and update the distance vector where possible. When it is no longer possible to perform further optimization, because of an illegality, or that the distance vectors have become un-manageable, or optimization has been completed, then the optimizer performs post-optimization phases 34 such as instruction scheduling and register allocation. The result is optimized intermediate representation 35 which is then processed by object file generator 24 into compiled object code 13.

Each node in the internal representation of a program represents potentially many different run-time references. The family of dependencies from node NA to node NB is the set of dependencies between potential run-time references to node NA and run-time references to node NB. Arcs that the compiler draws between nodes are representations of such families. For example, for the loop shown in CODE BLOCK 1, the compiler draws and labels an arc from $x(i+1)=$to $x(i)$ to represent the family of dependencies shown in CODE BLOCK 2.

CODE BLOCK 1 do $i = 1, n$ $x(i+1) = x(i) * y(i)$ enddo

CODE BLOCK 2

$x(2) = - - > x(2)$ $x(3) = - - > x(3)$ $x(4) = - - > x(4)$

CODE BLOCK 3 do $i = 1, n$ do $j = 1, n$ do $k = 1, n$ $x(i+1, j+2, k+3) = 0$ enddo enddo enddo A memory reference occurs within some number of surrounding loops. An iteration vector identifies on which iterations of those loops that execution of a particular node causes a specific memory reference. If there are n surrounding loops for the node, the iteration vector for a reference is a n-tuple. Each component of the n-tuple is the iteration number for the corresponding surrounding loop, wherein the outermost loop corresponds to the first component, and so on. For example, CODE BLOCK 3 depicts a program fragment with a 3-deep, nested loop, specifically Do i, Do j, Do k, wherein each loop steps by one and the upper bound limit for each loop is n. The loop body consists of a single reference to a three dimensional array element for an array called x. The first dimension subscript is i+1, the second is j+2, and the third is k+3. The iteration vector for the assignment x(3,7,4)=is (1,4,0) for a 0-origin iteration vector. For a 1-origin iteration vector, the vector would be (2,5,1). Using the 0-origin will encompass all possible programming languages. FORTRAN, which uses 1-origin would be skewed appropriately.

CODE BLOCK 4

*do i = 1, n*

*do j = 1, n*

$y(i+3, j-1) = y(i, j)$

*enddo*

*enddo*

A distance vector is the difference between two iteration vectors. For example, CODE BLOCK 4 depicts a program fragment with a 2-deep, nested loop, specifically Do i, Do j, wherein each loop steps by one and the upper bound limit for each loop is n. The loop body consists of a single reference to an assignment to a two dimension array y, wherein y(i+3, j−1)=y(ij). The iteration vectors for y(4,4)=and y(4,4), are (0,4) and (3,3), respectively. The distance vector is (3,3) minus (0,4) which is (3,−1). For a sign convention, the iteration vector for the destination is first in the subtraction. The sign convention is not important so long as it is consistently applied throughout the analysis. Please note that it is not always true that distance vectors can be computed by subtracting subscripts, typically for loops with a non-unit stride.

A direction vector is the sign of the distance vector, in other words, a direction vector is realized when each component of the distance vector is replaced with a +1,0, and/or −1. For example, the distance vector of (3,−1), has a corresponding direction vector of (+1,−1). Direction vectors are usually written symbolically, rather than numerically, with "<" for a +1, a "=" for a 0, and a ">" for a −1. Thus, the distance vector of (3,−1) is represented by (<,>). The "<" symbol indicates from a lesser to a greater iteration, while the ">" symbol indicates from a greater to a lesser iteration.

Dependence families are often uniform, meaning that all dependencies in the family have the same distance and direction vectors. Referring to the loop of CODE BLOCK 4, the dependence family for y(i+3, j−1)=to y(i,j) is uniform. Therefore, (3,−1) can be considered a family distance vector, and (<,>) as the family direction vector.

The compilers of super computers use optimization techniques that actually transform the program code inputted by the user to better utilize the architecture of the machines. For example, for a parallel processing machine, instead of performing an operation sequentially, such that the machine is waiting for step two to be complete before proceeding to step three, the machine will re-write the program to allow steps two and three to be processed simultaneously. The compiler will perform a dependency analysis to determine whether this type of transformation is legal. If the transformation is legal, the user will get a significant increase in speed, such as five times, plus a guarantee that the results are correct from the dependency analysis. If the transformation is illegal, the compiler will run the code as is and not transform it.

One particular area that the compiler can optimize is iterative constructs or loops. For example, a section of a program is written to perform a matrix multiply where the different rows and columns of the matrix are multiplied together. The compiler may determine that by using various transformations, that section of code can be re-written to run faster and still achieve the correct results.

Before performing the transformation, the compiler will perform a dependency analysis for every loop nest in the program, and for every reference pair in each nest, to determine the iteration space and the memory constraints of the references during their lifetimes in the surrounding loops. That information is typically recorded in compilers as distance (or dependence) vectors and direction vectors. The length of the distance vector is the number of common loops that the references span, and each element in the vector provides a memory dependence distance. The direction vector can be used if the distance is not immediately determinable from the iteration vectors of the two references.

One loop transformation that is commonly performed by the compiler uses distance vectors and is referred to as loop strip-mining or loop blocking. This loop transformation involves a reduction in the overhead of a loop by running a loop in sections. This allows more reuse of cache memory when processing the loop. Typically, machines have a cache memory system, for example, L2 cache, that is different than their registers, which is located very close to the processor, such that latencies are less than going to the more remote RAM memory. However, there is a penalty incurred in reloading the cache, in terms of time and performance. As the penalty is expensive, consequently it is advantageous to decrease the number of cache loads.

Strip-mining will decrease the number of cache loads by transforming the loop so as to fit within the cache. The loop is transformed by adding an additional loop, such that the inner loop would access each cache line, and the outer loop would access the entire cache. This type of transformation is commonly used in super computers from vectors processing through parallel processing, to minimize cache memory latencies. The transformation introducing an additional loop that was not present in the original program code, and changes the subscripts for array elements in the transformed loop to be functions of both the original loop and the new loop.

An example of strip-mining or blocking shown in CODE BLOCKS 5 and 6, which respectively depict a one loop nest that becomes a two loop nest after blocking or strip-mining. The compiler would calculate the dependencies once for the entire program for every loop nest. This is a very expensive process which involves practically a pair-wise algorithm, meaning, that for X references there would be approximately $X^2$ possibilities.

CODE BLOCK 5

*do i = 1, 10*

$a(i + 3) = ...$ $... = a(i)$

CODE BLOCK 6

*do j = 1, 10, 4*

*do i = j*, $\min(j + 4 - 1, 10)$

-continued $$a(i+3) = \ldots$$
$$\ldots = a(i)$$

CODE BLOCK 5 depicts a simple loop, wherein Do i=1 to 10, a(i+3)=, and there is a use of a(i) within the loop. The compiler may determine that it would be more efficient to run this loop in sections of 4, based upon characteristics of the computer system, particularly the size of the cache, as compared with the size of the loop. Thus, an outer loop is added, and the terms of the inner loop are modified as shown in CODE BLOCK 6, wherein the original code is transformed into Do j=1 to 10 by 4 and Do i=j to min of (j+4−1, 10), with a(i+3) is=and a(i). Thus, j will have the values of 1, 5, and 9. The values of i will change with j, such that i will have the values 1–4 when j=1, i will have the values 5–8 when j =5, and i will have the values 9–10 when j=9. Thus, the step size has been changed from one to 4, such that the inner loop runs strips of the outer loop up to a maximum of either 4, which is the strip size length, or the remainder if the loop iteration count is not evenly divisible without remainder by the strip size. The outer loop is referred to as the section loop and the inner loop is referred to as the element loop.

In a prior art compilers, after completing this transformation the compilers cannot do much more with this loop, and consequently they cannot optimize any loop after it has been blocked. This is because the subscripts have become obtuse and complicated. What used to be simple subscripts are now complicated by the additional loop. Moreover, the additional loop did not exist in the original code, meaning that the original distance vector would have to be re-sized or re-calculated. This is further complicated in that for dependence analysis to be run, every loop has to be normalized, meaning that every loop has to be unity based, where the induction variable begins at 1 and steps by 1.

CODE BLOCK 7 do j = 1, 3 do i = (j − 1) ∗ 4 + 1, min((j − 1) ∗ 4 + 4, 10)

a(i + 3) = ...

... = a(i)

CODE BLOCK 8 do j = 1, 3 do i = 1, min(4, 4 ∗ j mod 10)

a(4j + i − 1) = ...

... = a(4j + i − 4)

For example, the loop nest shown CODE BLOCK 6 is normalized as shown in CODE BLOCKS 7 and 8. The outer loop is normalized first, as shown in CODE BLOCK 7, and then the inner loop is normalized as shown in CODE BLOCK 8. The loop nest shown in CODE BLOCK 8 would be the input to the dependency analysis of the prior art compiler. The subscript expressions are couple-subscriptions, meaning that every subscript is now a function of both the inner and the outer loop induction variables. This makes solving what was a simple subtraction to determine the distance vector into a complex calculation which includes having to solve for more than one unknown. Also, what had been a constant iteration space or dependence distance, which was the difference of A(i+3) and A(i), or 3, is now variable, and is dependent upon the values of the induction variables, i and j.

A major problem in the prior art is that compilers will perform blocking or strip-mining as the last loop transformation. This is because it is difficult to test the legality of any optimization after this point, since loop bounds would then contain min and mod functions. Also, subscripts that were functions of a single loop induction variable are now functions of multiple loops. A prior art compiler, even if it could compute the dependencies after this transformation, would arrive with an overly conservative result due to so many new variables in the equation, and would incur a large expense for re-computing them.

Moreover, if the compiler were to re-calculate the dependencies after every transformation, it is more than likely that information will be lost, because on each subsequent transformation, the loop bounds subscripts are becoming complicated from the semantics of each transformation. Prior art compilers just compute the dependencies once up front, and then perform a static ordering of the optimization transformations. The compilers halt optimizations when they encounter a single subscript that is a function of more than one loop induction variable. At this point, the compiler would assign registers and emit machine code. The distance and directions vectors, if they were to be calculated from the coupled-subscript expressions in CODE BLOCK 8, would appear as follows:

CODE BLOCK 9

|  |  |  | distance | direction |
|---|---|---|---|---|
| (1, 1) | → | (1, 4) | (0, 3) | ( = , <) |
| (1, 2) | → | (2, 1) | (1, −1) | ( < , >) |
| (1, 3) | → | (2, 2) | (1, −1) | ( < , >) |
| (1, 4) | → | (2, 3) | (1, −1) | ( < , >) |
| (2, 1) | → | (2, 4) | (0, 3) | ( = , <) |

Note that prior art compilers do not compute the results shown in CODE BLOCK 9 because of the overhead costs of normalization and the difficulty in considering coupled-subscript expressions. CODE BLOCK 9 is provided for comparison with the later described invention.

Therefore, there is a need in the art that would allow a compiler to update the distance vectors, permit non-static ordering of the optimizations, avoid incurring the overhead of normalizing and re-analyzing the dependencies, avoid having coupled subscript expressions, and allow the interchanging of loops, while maintaining simplicity and exactness throughout the compilation.

SUMMARY OF THE INVENTION

These and other objects, features and technical advantages are achieved by a system and method which uses two relationships to update the distance vectors after the loop strip-mining optimization has been performed by the compiler. The invention uses as input the original distance vector for the un-blocked loop, and outputs either one or two distance vectors, depending upon whether the distance divided by the strip size results in a natural number. Thus, the invention allows subsequent optimizations to occur, and eliminates the need of having to normalize the transformed loop, and having to recompute the subscripts. The invention also eliminates the need to re-analyze the dependencies of the loops, which is the $N^2$ computation previously discussed, and wherein the inputs to which have been complicated by the transformation itself.

Furthermore, the output from the invention is in the standard distance vector format which can be examined by and legality test for an optimization. Also, the input is in the same form as the output, as both are distance vectors, and this renders the blocking transformation transparent to subsequent optimizations, since the output becomes the input to a subsequent legality test of a subsequent transformation. The exactness and the uniformity of the invention allows; for non-static ordering of the optimizations, the compiler could block a loop, interchange it, re-interchange, and re-block it. The invention also avoids coupled subscripts, in which a subscript has more than one induction variable appears in more than one subscript position. The invention uses the original distance vectors exclusively, rather than continually recomputing the distance vectors from transformed subscript expressions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the Following descriptions taken in conjunction with the accompanying drawings, in which.

DESCRIPTION OF THE PREFERRED EMBODIMENTS

The invention uses two relationships to update the original distance vector of the un-blocked loop into either one or two distance vectors that are the distance vectors for the blocked or strip-mined loop. Whether there are one or two resulting distance vectors depends upon whether the strip size divides evenly into the distance and results in a natural number. The invention does not require re-computing of the dependencies for loop blocking or strip mining. The compiler merely updates the original distance vector using the relationships shown in CODE BLOCK 10 to determine the distance vector for the strip-mined loop.

CODE BLOCK 10

$(\text{floor}(d/ss), d \bmod ss)(\text{ceiling}(d/ss), d - (\text{ceiling}(d/ss) * ss))$

CODE BLOCK 11

$(0, d)(1, d - ss)$

CODE BLOCK 12

$(d/ss, 0)$

Figure 4:
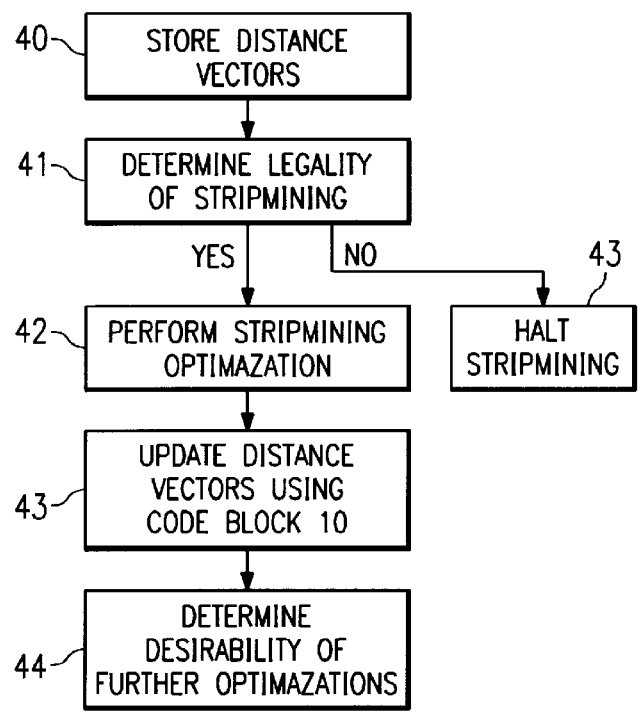
FIG. 4 depicts a schematic representation of a strip-mining optimization using the inventive relationships.

As shown in FIG. 4, the compiler stores the original distance vector 40, and determines the legality of performing strip-mining optimization 41. If it is legal, then the compiler performs strip-mining optimization 42, if not then, the compiler does not perform optimization 43. After strip-mining, the compiler uses the stored distance vector and applies the relationships in CODE BLOCK 10 to update the distance vector 43. The updating of the distance vector can occur before the optimization, so long as the optimization is legal. The updating may also occur simultaneously with the optimization. Note that in CODE BLOCK 10, the first relationship has two elements, the first of which determines the floor of the distance vector divided by the strip size. The floor function returns the largest integer that is less than or equal to the input. For example, the floor of 5/2, which is sometimes expressed as $\lfloor 5/2 \rfloor$, is equal to 2. The strip size or blocking factor is the side of the outer loop created by strip-mining. The second element of the first relationship is the modulo of the distance vector divided by the strip size. The modulo function, or mod, returns the remainder of a first input divided by a second input. For example, 10 mod 3 equals 1. The second relationship also has two elements, the first of which determines the ceiling of the distance vector divided by the strip size. The ceiling, function returns the smallest integer that is greater than or equal to the input. For example, the ceiling of 5/2, which is sometimes expressed as $\rceil 5/2 \lceil$, is equal to 3.

An example of the use of CODE BLOCK 10, as applied to the code in CODE BLOCKS 5 and 6 is as follows. The subscript expression in CODE BLOCK 5, a(i+3)=a(i), has an iteration vector (0) for the assignment of a(4)=, and an iteration vector of (3) for a(4). Thus, +3−0 equals the distance vector (3). This distance vector is then applied to the two relationships of CODE BLOCK 10, along with the strip size of 4 used in CODE BLOCK 6. Thus, the floor of ¾ equal to 0, the ceiling of ¾ equal to 1, and modulo of 3 divided by 4 equal to 3. This yields the updated distance vectors of (0,3) and (1,−1) for the strip-mined code of CODE BLOCK 6. This result agrees with the results in CODE BLOCK 9.

This example also depicts one of two special cases of the relationships of CODE BLOCK 10. Whenever the distance vector is less than the strip size, the factor of d/ss will always be less than one. Thus, the floor of d/ss will always be 0, the ceiling of d/ss will always be 1, and the modulo of d divided by ss will always be d. Therefore the relationships of CODE BLOCK 10 reduce down to that shown in CODE BLOCK 11. This result agrees with the results arrived above.

The second special case arises when the distance vector is a multiple of the strip size, for example when the distance vector is 4 and the strip size is 2. When this occurs, the floor of d/ss equals the ceiling of d/ss which equals d/ss. The modulo equals 0, since ss divides evenly into d. The first and second relationships of CODE BLOCK 10 both reduce down to the code of CODE BLOCK 12. Since the first and second relationships yield the same result, the original distance vector produces only one dependency when strip-mined. Another way of viewing this special case, is when d/ss results in a natural or counting number, (1,2,3, . . . ), then the code of CODE BLOCK 12 is used by the compiler to update the distance vector.

For direction vectors, a (<) direction loop (from a positive distance), becomes (=,<) and (<,>) if the dependence distance is less than the strip size. This result agrees with the code of CODE BLOCK 11. A (<) direction loop becomes (<,<) and (<,>) if the dependence distance is greater than the strip size (but not a multiple of the strip size as in CODE BLOCK 12). Thus, the general case for a (<) direction loop is (<=,<) and (<,>).

Both the input to and the output from the updating relationships are distance vectors. As shown above, given a distance d, when a loop is strip mined, the dependence distance relation produces one or two dependencies, and thus, it is possible to have more than one distance vector for a relationship between two memory locations. If two dependencies are produced, it is possible to have them summarized into a single dependence vector. However, to avoid ambiguity, it is better to keep them distinct. Note also that where there was only one element in the original distance vector for the un-strip-mined loop, there are now two elements in the updated distance vector. This is because the compiler has introduced a new loop for the blocking into the code. Even though the user did not write this loop, after strip-mining, this section of code is a two nested loop. Thus, each time blocking or strip-mining is performed an additional loop is created in the program code. Subsequent optimizations could readily be performed 44, if desirable, without having the dependence distance vectors re-computed. The compiler would check the legality of performing the subsequent optimization using the updated distance vectors. This allows for non-static ordering of the optimization routines. Therefore, the inventive relationships shown in CODE BLOCK 10, along with the two special cases shown in CODE BLOCKS 11 and 12, avoid the overhead costs of computing updated distance vectors shown in CODE BLOCKS 7, 8, and 9. The inventive relationships also avoid having to treat the coupled subscripts shown in CODE BLOCK 8, while maintaining simplicity, efficiency and exactness. The original distance vector is stored before the strip-mining optimization, and is then updated in place with the inventive relationships. The distance and direction vectors are typically stored in registers.

Although the present invention and its advantages have been described in detail, it should be understood that various changes, substitutions and alterations can be made herein without departing from the spirit and scope of the invention as defined by the appended claims.

What is claimed is:

1. A compiler system stored on a computer readable medium having computer programming logic recorded thereon for updating a distance vector pertaining to a section of code proximate to performing an optimization of the section of code, the system comprising:

means for storing the distance vector for the section of code prior to the optimization;

means for determining a criterion of the optimization; and means for updating the distance vector according to a predetermined expression that includes the criterion and the stored distance vector.

2. The compiler system of claim 1, further comprising:

means for determining a legality of performing the optimization.

3. The compiler system of claim 2, further comprising:

means for performing the optimization if the legality is legal.

4. The compiler system of claim 2, further comprising:

means for halting the optimization if the legality is illegal.

5. The compiler system of claim 1, further comprising:

means for performing the optimization.

6. The compiler system of claim 1, further comprising:

means for determining whether to perform further optimizations.

7. The compiler system of claim 1, wherein:

the criterion is a strip size; and the optimization is loop strip-mining.

8. The compiler system of claim 7, wherein:

the predetermined expression comprises first and second relationships.

9. The compiler system of claim 8, wherein:

the first relationship includes first and second elements;

the first element comprises a floor function; and the second element comprises a modulo function.

10. The compiler system of claim 9, wherein:

the first element is the floor function of the stored distance vector divided by the strip size.

11. The compiler system of claim 9, wherein:

the second element is the modulo function of the stored distance vector divided by the strip size.

12. The compiler system of claim 8, wherein:

the second relationship includes first and second elements; and both elements comprise a ceiling function.

13. The compiler system of claim 12, wherein:

the first element is the ceiling function of the stored distance vector divided by the strip size.

14. The compiler system of claim 12, wherein:

the second element is difference of the stored distance vector minus the multiplication of the strip size times the ceiling function of the stored distance vector divided by the strip size.

15. The compiler system of claim 7, wherein:

the stored distance vector is a multiple of the strip size;

the predetermined expression comprises first and second elements;

the first element is the stored distance vector divided by the strip size; and the second element is zero.

16. The compiler system of claim 7, wherein:

the stored distance vector is less than the strip size;

the predetermined expression comprises first and second relationships;

the first relationship comprises first and second elements; the first element of the first relationship is zero; and the second element of the first relationship is the stored distance vector; and the second relationship comprises first and second elements;

the first element of the second relationship is one; and the second element of the second relationship is the stored distance vector minus the strip size.

17. A compiler system stored on a computer readable medium having computer programming logic recorded thereon for updating a distance vector (D) pertaining to a section of code proximate to performing a loop strip-mining optimization of the section of code, the system comprising:

means for storing the distance vector for the section of code prior to the strip-mining optimization;

means for performing the strip-mining optimization;

means for determining a strip size (S) of the strip-mining optimization; and means for updating the distance vector according to first and second predetermined relationships;

wherein the first predetermined relationship is (floor(D/S), D mod S); and the second predetermined relationship is (ceiling(D/S), D-(ceiling(D/S)* S).

18. The compiler system of claim 17, further comprising:

means for determining a legality of performing the strip-mining optimization.

19. The compiler system of claim 17, further comprising:

means for determining whether to perform further optimizations.

20. The compiler system of claim 17, wherein:

the stored distance vector (D) is a multiple of the strip size (S); and the first and second predetermined relationships both reduce to (D/S 0).

21. The compiler system of claim 17, wherein:

the stored distance vector (D) is less than the strip size (S);

the first relationship reduces to (0, D); and the second relationship reduces to (1, D-S).

22. A computer implemented method for updating a distance vector pertaining to a section of code proximate to performing an optimization of the section of code, the method comprising the steps of:

storing the distance vector for the section of code prior to the optimization;

determining a criterion of the optimization; and updating the distance vector according to a predetermined expression that includes the criterion and the stored distance vector.

23. The method of claim 22, further comprising the step of:

determining a legality of performing the optimization.

24. The method of claim 23, further comprising the step of:

performing the optimization if the legality is legal.

25. The method of claim 23, further comprising the step of:

halting the optimization if the legality is illegal.

26. The method of claim 22, further comprising the step of:

performing the optimization.

27. The method of claim 22, further comprising the step of: p1 determining whether to perform further optimizations.

28. The method of claim 22, wherein:

the criterion is a strip size; and the optimization is loop strip-mining.

29. The method of claim 28, wherein the predetermined expression comprises first and second relationships;

the first relationship includes first and second elements;

the first element of the first relationship is the floor function of the stored distance vector divided by the strip size; and the second element of the first relationship is the modulo function of the stored distance vector divided by the strip size; and the second relationship includes first and second elements;

the first element of the second relationship is the ceiling function of the stored distance vector divided by the strip size; and the second element of the second relationship is difference of the stored distance vector minus the multiplication of the strip size times the ceiling function of the stored distance vector divided by the strip size.

30. The method of claim 28, wherein:

the stored distance vector is a multiple of the strip size;

the predetermined expression comprises first and second elements;

the first element is the stored distance vector divided by the strip size; and the second element is zero.

31. The method of claim 28, wherein:

the stored distance vector is less than the strip size;

the predetermined expression comprises first and second relationships;

the first relationship comprises first and second elements; the first element of the first relationship is zero; and the second element of the first relationship is the stored distance vector;

the second relationship comprises first and second elements;

the first element of the second relationship is one; and the second element of the second relationship is the stored distance vector minus the strip size.

32. A computer program product having a computer readable medium having computer program logic recorded thereon that updates a distance vector pertaining to a section of code proximate to performing an optimization of the section of code, the computer program product comprising:

code for storing the distance vector for the section of code prior to the optimization;

code for determining a criterion of the optimization; and code for updating the distance vector according to a predetermined expression that includes the criterion and the stored distance vector.

33. The computer program product of claim 1, further comprising:

code for determining whether to perform further optimizations.

34. The computer program product of claim 32, wherein:

the criterion is a strip size; and the optimization is loop strip-mining.

35. The computer program product of claim 34, wherein:

the predetermined expression comprises first and second relationships.

36. The computer program product of claim 35, wherein:

the first relationship includes first and second elements;

the first element comprises a floor function; and the second element comprises a modulo function.

37. The computer program product of claim 36, wherein:

the first element is the floor function of the stored distance vector divided by the strip size.

38. The computer program product of claim 36, wherein:

the second element is the modulo function of the stored distance vector divided by the strip size.

39. The computer program product of claim 35, wherein:

the second relationship includes first and second elements; and both elements comprise a ceiling function.

40. The computer program product of claim 39, wherein:

the first element is the ceiling function of the stored distance vector divided by the strip size.

41. The computer program product of claim 39, wherein:

the second element is difference of the stored distance vector minus the multiplication of the strip size times the ceiling function of the stored distance vector divided by the strip size.

42. The computer program product of claim 34, wherein:

the stored distance vector is a multiple of the strip size;

the predetermined expression comprises first and second elements;

the first element is the stored distance vector divided by the strip size; and the second element is zero.

43. The computer program product of claim 34, wherein:

the stored distance vector is less than the strip size;

the predetermined expression comprises first and second relationships;

the first relationship comprises first and second elements;
 the first element of the first relationship is zero; and
 the second element of the first relationship is the stored distance vector; and the second relationship comprises first and second elements;
 the first element of the second relationship is one; and
 the second element of the second relationship is the stored distance vector minus the strip size.

* * * * *

UNITED STATES PATENT AND TRADEMARK OFFICE
CERTIFICATE OF CORRECTION

Figure 1:
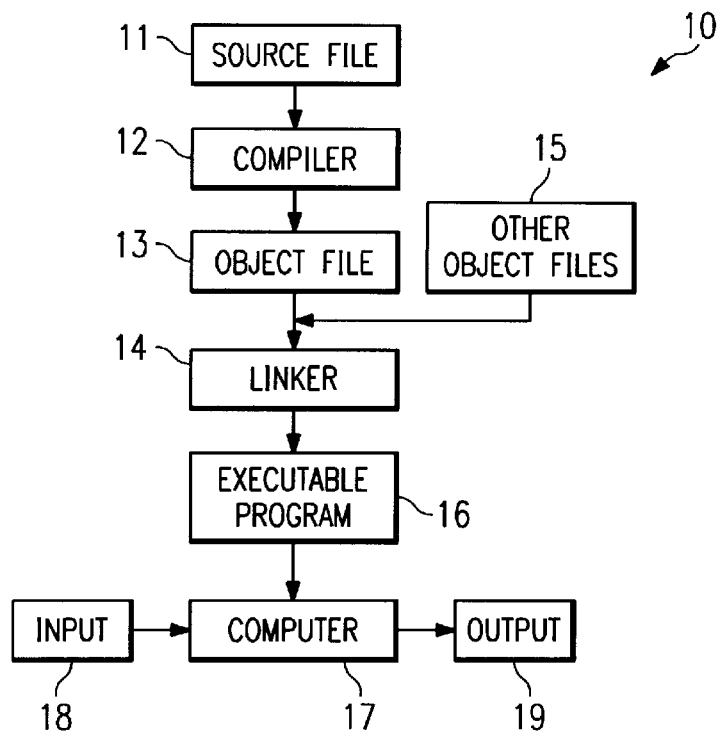
FIG. 1 depicts the general arrangement of a compilation environment.
Figure 2:
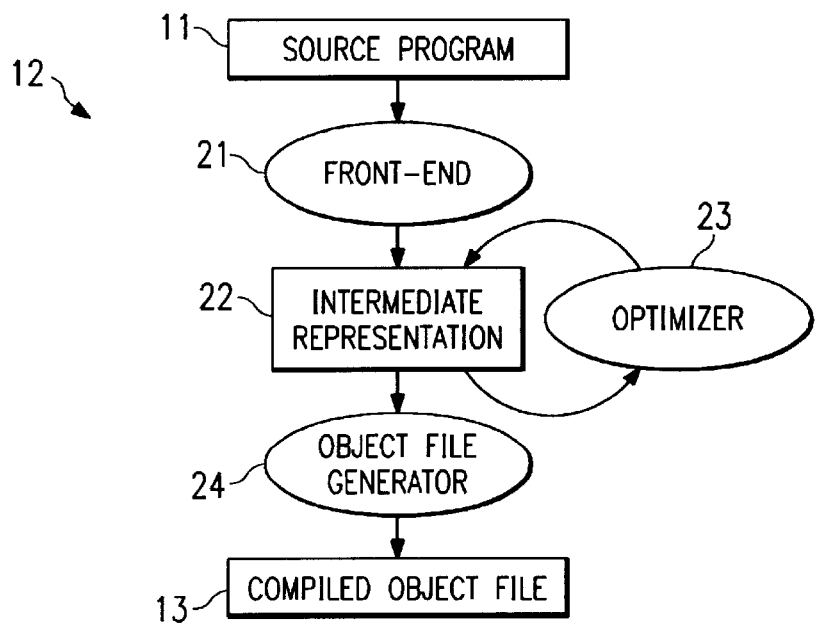
FIG. 2 depicts the internal structure of the compiler of FIG. 1.
Figure 3:
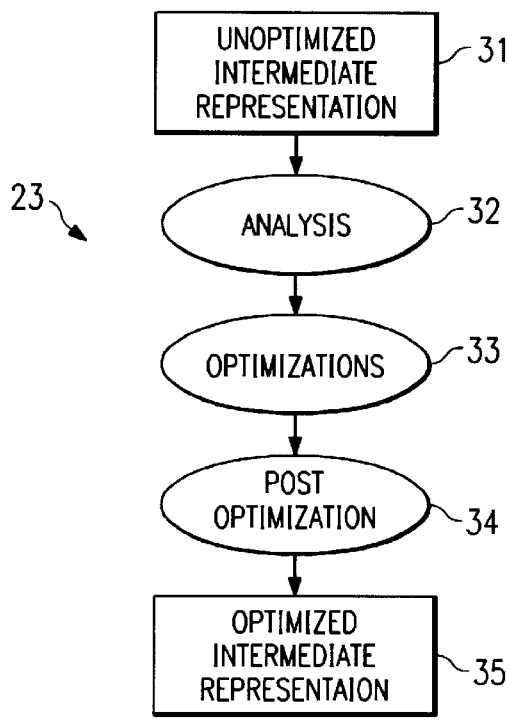
FIG. 3 depicts the internal structure of the optimizer of FIG. 2.

PATENT NO.    : 6,059,841
DATED         : May 9, 2000
INVENTOR(S)   : Terry J. Caracuzzo It is certified that error appears in the above-identified patent and that said Letters Patent is hereby corrected as shown below:

Drawings,
Sheet 2 of 2, in FIG. 3, reference numeral 35, delete "REPRESENTAION" and insert therefor -- REPRESENTATION --
Sheet 2 of 2, in FIG. 4, reference numeral 42, delete "OPTIMAZATION" and insert therefor -- OPTIMIZATION --
Sheet 2 of 2, in FIG. 4, reference numeral 44, delete "OPTIMAZATION" and insert therefor -- OPTIMIZATION --

Column 11,
Line 58, after "of:" delete "p1" and begin a new line

Signed and Sealed this

Fourth Day of June, 2002

*Attest:*

*Attesting Officer*

JAMES E. ROGAN
*Director of the United States Patent and Trademark Office*